United States Patent [19]

Jacquet

[11] 4,267,880

[45] May 19, 1981

[54] AIR DISTRIBUTION DEVICE

[75] Inventor: Maurice A. Jacquet, Maurepas, France

[73] Assignee: Societe Anonyme Francaise du Ferodo, Paris, France

[21] Appl. No.: 14,566

[22] Filed: Feb. 23, 1979

[30] Foreign Application Priority Data

Feb. 24, 1978 [FR] France ................................ 78 05406

[51] Int. Cl.³ ...................... F16K 11/18; F16K 19/00; B60H 1/24
[52] U.S. Cl. ...................................... 165/41; 98/2.08; 137/862; 137/875
[58] Field of Search .................... 137/862, 875, 625.44; 165/41, 42, 43; 98/2.08

[56] References Cited

U.S. PATENT DOCUMENTS

| 83,808 | 11/1868 | Van Norman et al. | 137/875 |
| 2,225,071 | 12/1940 | Meyerhoefer | 137/862 X |
| 3,895,650 | 7/1975 | Cadiou | 137/875 |

FOREIGN PATENT DOCUMENTS

| 2063253 | 7/1971 | France . | |
| 2215043 | 8/1974 | France . | |
| 2238105 | 2/1975 | France | 137/875 |
| 2266084 | 10/1975 | France | 137/625.44 |
| 2333180 | 6/1977 | France . | |
| 957997 | 5/1964 | United Kingdom | 137/625.44 |

Primary Examiner—Gerald A. Michalsky
Attorney, Agent, or Firm—Staas & Halsey

[57] ABSTRACT

A distribution device in the passenger space of a motor vehicle for the air arriving from an inlet opening of a chamber towards two ducts extending from said chamber and reaching air outlet nozzles, usually upper and lower, which comprises a flap rotatably mounted, for the distribution, about an axis at a distance from the air inlet opening. The flap has two branches forming a V with an obtuse apex angle and controlling the respective inlets of the ducts and the edges of which, which are remote for the pivoting axis, are constantly in the respective outlet ducts.

11 Claims, 11 Drawing Figures

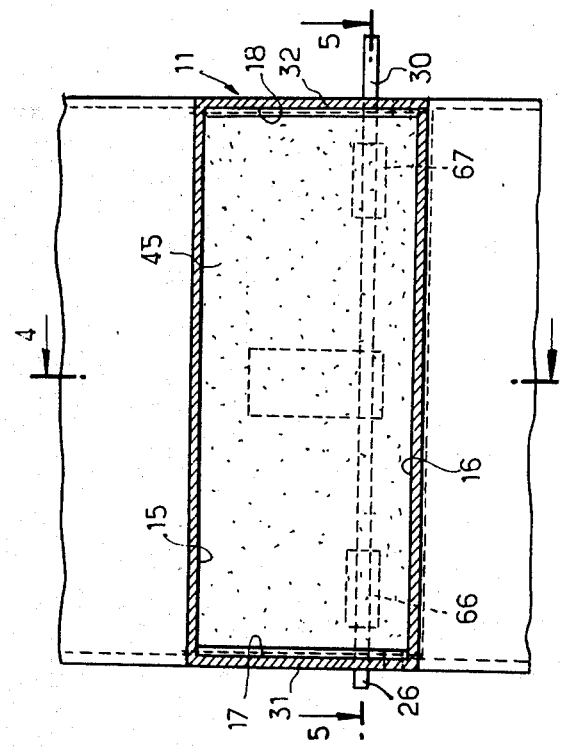

AIR DISTRIBUTION DEVICE

The invention relates to an flap air distribution device, particularly for the heating and/or the air conditioning of the passenger space of a motor vehicle.

Usually, an installation for the air conditioning of the passenger space of a motor vehicle comprises means for supplying air to an upper nozzle and to a lower nozzle, according to an adjustable distribution system operated at will by the user, the air admitted being frequently at a temperature also adjustable by the user.

In most of such installations, the distribution of the air depends on the position of a flap or throttle controlling an inlet opening of a chamber from where extend two ducts ending in respectively the upper and the lower nozzles and which, according to its position, directs a more or less larger proportion of the air towards one of the ducts, the remnant being directed towards the other duct.

There has been proposed a device with a flat pivotally mounted about an axis at a distance from the air inlet opening and the edge of which, which is most remote from the pivoting axis, is displaceable in the inlet opening. The size of the chamber immediately downstream of the inlet opening has to be of the order of magnitude of the radial length of the flap, which leads to a bulky device. Moreover, if the distribution device is preceded by an air heating apparatus comprising a heat exchanger with means for directing towards the exchanger an adjustable proportion of the outer air admitted, while the air which is not directed towards the exchanger flows directly towards the distribution device, it is then indispensable—since the mixing of heated air and not heated air cannot be carried out inside the chamber—to foresee between the exchanger and the distribution device a second chamber with a length sufficient for a good mixing of the heated air and the non heated air so as to avoid a difference of temperature of an undesirable magnitude between the air reaching one or the other of said ducts, at least for some working conditions.

The air distribution device according to the invention, which comprises a flap rotatably mounted about an axis at a distance from the air inlet opening is characterized in that said flap has two branches forming a V with an obtuse apex angle controlling respectively the duct inlets and the edges of which, which are remote from the axis, are constantly in the respective ducts.

In this way, the volume of the chamber may be maintained at a reduced value and thus, the space occupied by the distribution device is small.

Furthermore if a heat exchanger is situated upstream of the inlet opening, it is not indispensable to provide upstream of the distribution device a chamber specially provided for the mixing of the cold air and the hot air since in all the working conditions, said mixing can be carried out in the device chamber while respecting the temperature law which is desirable for the comfort of the occupier or occupiers of the vehicle.

The object of the invention is an embodiment of the device characterized in that a second flap is pivotally mounted on one edge, remote from the axis, of one of the flap branches, means being provided so that when the V-shaped flap is in a determined position, for instance when said branch closes up the duct which it controls, the second flap may be controlled for closing up the device inlet opening.

The invention provides an embodiment wherein the kinematic means used for the whole of the control unit are particularly simple and free of any spring, with the benefit of an easy operation and a long life under good working conditions.

The invention will become more apparent from the following description given as example and with reference to the accompanying drawings wherein:

FIG. 2 is an elevation view of the device at a larger scale;

FIG. 3 is a frontal face view;

FIG. 4 is a sectional view along line 4—4 of FIG. 3;

FIG. 5 is a sectional view along line 5—5 of FIG. 3;

FIG. 6 is a partial side view;

FIG. 8 is a partial front view of a closing flap of the inlet opening;

Figure 1:
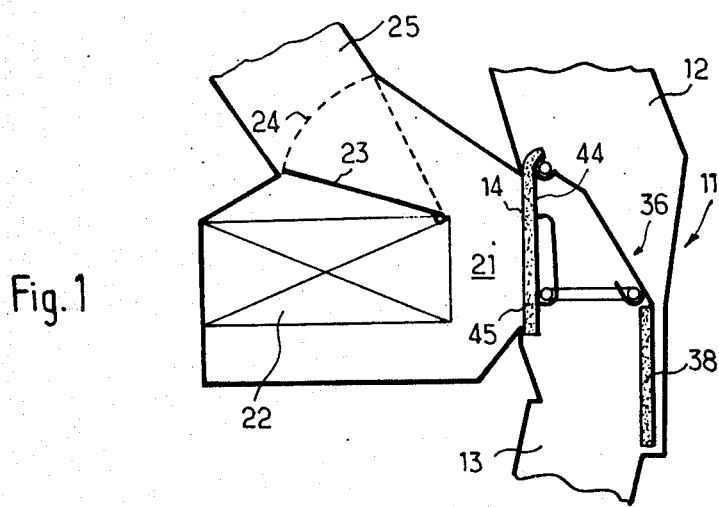
FIG. 1 is a vertical cross-sectional schematic view of an installation provided with the flap device according to the invention.

The flap distribution device according to the invention comprises a casing 11 (FIGS. 1 and 4) connectable with an upper duct 12 and a lower duct 13, or else formed integrally with them, as is shown, and providing an inlet opening 14 of rectangular cross-section bounded by edges 15 and 16 and 17, 18 (FIG. 3).

The inlet opening 14 of the distribution device forms the outlet of a chamber 21 containing a heat exchanger 22 as well as a flap 23 controlling the opening of a fresh air inlet channel 25 for directing through the heat exchanger 22 a proportion of air which is adjustable as a function of the greater or the lesser quantity of heating desired for the passenger space.

Shaft ends 26, 30 in alignment along an axis 33 and part of a crank rod 40 extend rotatably through the side walls 31 and 32 (FIG. 5) of casing 11 in the region of their rear portion. On the shaft end 30 is keyed an operation crank 35 (FIG. 6) connected to a driving system the other end of which is at the disposal of the driver.

The shaft ends 26 and 30 form the ends of the two aligned outer portions 61 and 62 of rod 40 which is substantially U-shaped and comprises a body or bottom 63 and two branches 64 and 65 diverging relative to body 63, the latter being parallel to the outer portions 61 and 62. Via said portions, the rod 40 is journalled in two bearings or hooks 66 and 67 formed on a flap 36 having two branches 37 and 38 forming together a widely obtuse constant angle. The outer end 39 of branch 37 is slightly angularly off-set relative to body 41 of the branch, in the region near the rear portion 42 of casing 11, and on the outer edge or axis 43 is rotatably mounted a second flap 44 the surface of which is slightly larger than that of the inlet opening 14, the flap 44 being coated on its face turned towards chamber 21 with a layer 45 capable of sealing the inlet opening 14 when said layer cooperates with the ridges 46 and 47 formed on the edges 15 and 16. On the back of flap 44 is mounted a stirrup 76 formed with a bottom portion 77 parallel to said flap and two connecting portions 78 and 79 with the flap body, thereby providing a gap or flat channel 81.

On the lower portion of flap 44 are mounted cylindrical pins 48 and 49 (FIG. 8) parallel to edge 43 and engaging grooves or slides 51 and 52 (FIGS. 2 and 4) formed in the side walls 31 and 32 of casing 11. Each groove is formed with a first portion 53 bounded by two circular edges 54 and 55 the center of which is on edge 43 when branch 37 is in its position wherein said edge is adjacent the anterior frontal wall 42 of the casing, and a second portion 56 bounded by edges 57 and 58 coaxial with axis 33.

Figure 7:
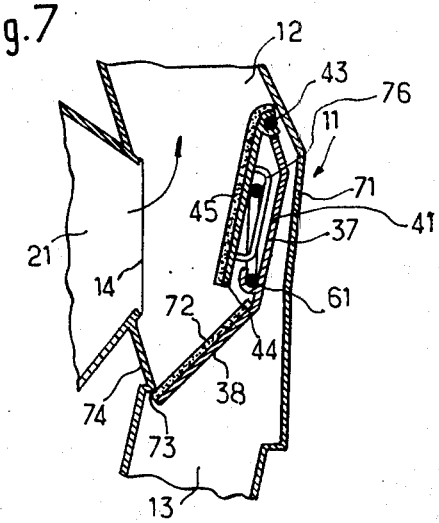
FIG. 7 is a view similar to FIG. 4, but at a smaller scale and for another condition.

The operation is as follows:

In the position shown in FIGS. 6 and 7, the crank 35 is vertical. The branch 37 the body 41 of which is substantially vertical is adjacent the posterior frontal wall 71 of casing 11. The branch 38, advantageously coated with a flexible layer 72 such as a leaf of a foamed material, closes up the lower duct 13, the sealing being provided by the cooperation of the coating 72 with an edge 73 of the anterior frontal face 74 of the casing.

The flap 44 is substantially joined to branch 37; the pins 48 and 49 are in the portion 56 of the grooves of slides 51 and 52. The angular displacement between the outer end 39 of branch 37 and body 41 of the branch provides housing for the flat stirrup 76 when the flap 44 is parallel to branch 37, being thus substantially joined to it.

From this position, an activation of the crank through a traction in the direction of arrow f (FIG. 6) by the driving system schematically designated at 75 and the other end of which is under the control of the driver rotates freely the assembly formed by the flaps 36 and 44, flap 44 being joined to branch 37, the pins 48 and 49 riding in the circular portion 56 of the slides centered on axis 33.

Figure 9:
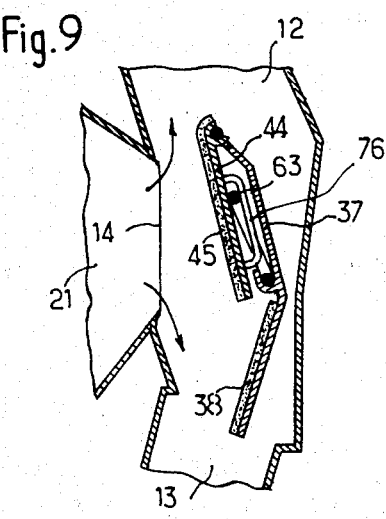
FIG. 9 is a view similar to FIG. 7, but for another condition.

FIG. 9 shows an intermediate position between that shown in FIG. 7 and that corresponding to the end of the ride of the pins or teats 48 and 49 in the circular portion 56.

In the position shown in FIG. 9, the air admitted through the inlet opening 14 is distributed towards the upper duct 12 and the lower duct 13. The gap between the anterior wall of the casing and the flap device is favourable for a good mixing, if it takes place, of the cold air stream flowing directly from channel 25 and the hot air stream arriving from the heat exchanger 22 and without it being necessary to provide to this effect a chamber with a length of consequence downstream of the heat exchanger 22 and the flap 23.

By the expression "good mixing" is not meant necessarily that the air flowing from the lower nozzle is at the same temperature as the air flowing from the upper nozzle. A difference of temperature between these two air streams is acceptable and even desirable; in fact, it is preferable that the air exiting from the lower nozzle be hotter than the air exiting from the upper nozzle; however this difference should not be excessive so that the comfort conditions inside the passenge space of the vehicle are respected. The V-shaped flap distribution device provides a good control of said temperature difference and this in its various settings.

Figure 10:
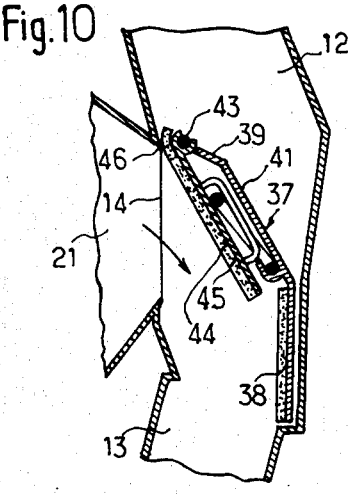
FIG. 10 is a view similar to FIG. 9 but for another condition.

FIG. 10 shows the position of the flap at the end of the ride of pins 48 and 49 in the slide portion 56. In this position, the admission to the upper duct 12 is completely shut off and this tightly through the cooperation of coating 45 and of flap 44 with the ridge 46 of the upper edge 15 of the inlet opening 14.

From this position, and continuing to operate the crank 36 further in the same direction, the flap 44 is drawn away from branch 37 through the opening of the angle formed between flap 44 and branch 37 due to the cooperation of the base 63 of the U formed by the four bends rod 40 and the stirrup (FIG. 4).

Figure 11:
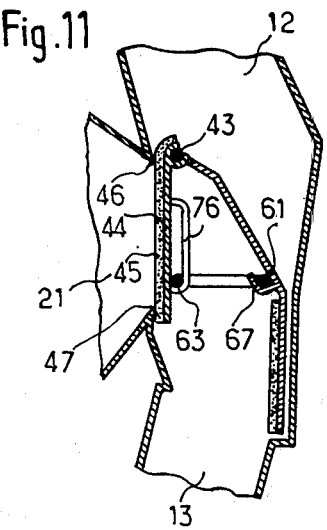
FIG. 11 is a view similar to FIG. 9, but for still another condition.

The pivoting of flap 44 relative to branch 37 progressively shuts off the inlet opening 14 up to the position where the shutting off is complete, as is shown in FIG. 11. The sealing off is provided by the cooperation of ridges 46, 47 of the opening, with the coating 45 of shutter 44. When, through the effort applied by the crank rod 40 on flap 44, the latter pivots about axis 43 until it reaches ridge 47, as is shown in FIG. 4 in phantom for the portion 63 of rod 40, the continuation of the drive pivots shutter 44 about ridge 47 for providing tightness also on edge 46.

The invention foresees also an embodiment according to which the movement of flap 44 for shutting off and freeing the inlet opening is not a pivoting movement but, at least partly, a translation movement perpendicular to the inlet opening plane.

The distribution device is also usable in an installation comprising an evaporator instead of a heat exchanger or complementary to the latter.

I claim:

1. A device for distributing in a passenger space of a motor vehicle the air arriving from at least one channel into an inlet opening for two ducts, comprising a flap with two branches forming a V rotatably mounted on an axis, a first branch of the flap being able to control the opening and shutting off of the first duct, a second branch of the flap being able to control the opening and shutting off of the second duct, wherein a second flap is mounted on the edge of one of the branches of the V-shaped flap which is remote from the pivoting axis, means being provided for independently displacing said second flap when said one branch is in the shutting off position of the duct which it controls so as to control the opening and shutting off of the inlet opening.

2. The device according to claim 1, wherein the second flap is rotatably mounted about the edge of said branch which is remote from the axis.

3. The device according to claim 1 or 2, wherein there is a kinematic connection between the second flap and said branch so that the same driving member provides control of the V-shaped flap and control of the second flap.

4. The device according to claim 3, wherein the control of the second flap applies first one of the edges of said second flap with a pressure against a first cooperating ridge of the inlet opening, and then the opposite edge against another cooperating ridge of said inlet opening, thereby shutting off said inlet opening.

5. The device according to claim 1 or 2, wherein the axis about which is rotatably mounted the first flap forms a portion of a bent rod having a second portion which is parallel thereto and connected to the second flap through a stirrup mounted on the latter.

6. The device according to claim 5, wherein in the vicinity of the edge of said one branch of the first flap on which is mounted the second flap, said branch is deflected so that the second flap provided with its stirrup may be disposed parallel to said branch.

7. The device according to claim 1, wherein the second flap carries on its side edges pins provided for guiding it in slides of the side walls of the device.

8. The device according to claim 7, wherein each of said slides comprises a first portion of slide which is defined by segments of circles the center of which corresponds to the edge of said one branch of said first flap when the latter is in the shutting off position of the duct which it controls, said first portion of slide being connected to a second portion of slide which is defined by segments of circles the center of which corresponds to the mounting axis of said first flap.

9. The device according to claim 1, wherein the second flap carries a joint provided for the tight shutting off of the inlet opening.

10. The device according to claim 1, wherein there is upstream of the inlet opening, in the vicinity of the latter, a heat exchanger and means for directing towards the exchanger an adjustable porportion of the admitted outer air, the air directed towards the exchanger flowing directly towards the distribution device, said device being such that for the various positions of the V-shaped flap, the portion common to the two ducts which is adjacent the inlet opening in the device has a volume sufficient for an appropriate mixing of the hot air and the cold air flowing therethrough.

11. The device according to claim 1, wherein the branch of the V-shaped flap on which is not mounted the second flap carries a joint for providing a tight closing of the duct which it controls.

* * * * *